Oct. 1, 1968   R. THIRION   3,403,946
VEHICLE BRAKING PRESSURE LIMITING DEVICE
Filed Oct. 30, 1967
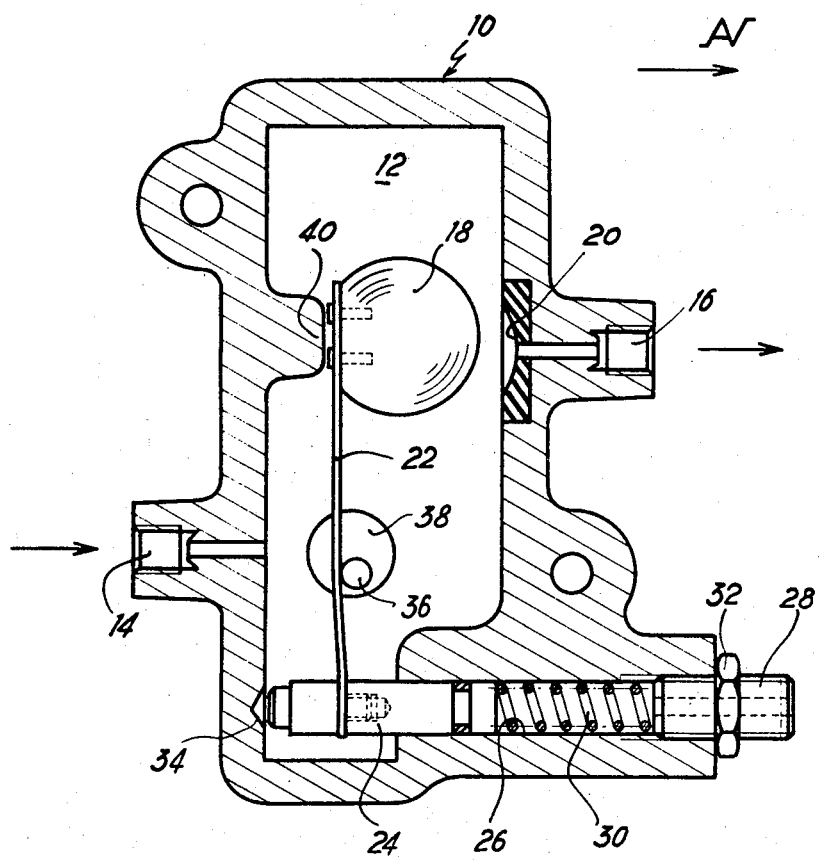
INVENTOR
RENE THIRION.
BY
ATTORNEY.

3,403,946
VEHICLE BRAKING PRESSURE LIMITING DEVICE
René Thirion, Paris, France, assignor to
Societe Anonyme D.B.A.
Filed Oct. 30, 1967, Ser. No. 678,794
Claims priority, application France, Nov. 10, 1966,
83,282
7 Claims. (Cl. 303—24)

ABSTRACT OF THE DISCLOSURE

A brake pressure limiting device comprising an inertia member connected to a resiliently deformable leaf spring positioned perpendicular to the vehicle axis. The leaf spring cooperates with a manually operated adjusting member connected to the housing and with a pressure responsive plunger so that the leaf spring is subjected to a first return torque as a function of the position of the adjusting member and to a second return torque varying as a function of the position of the plunger.

---

The invention relates to a vehicle braking pressure limiting device provided to shut off the communication between a brake control master cylinder and receiver wheel cylinders of a set of brakes of a same vehicles axle when the deceleration generated upon braking operation reaches a predetermined value.

More particularly, the braking pressure limiting device according to the invention is of the type comprising in a housing a movable inertia-operated member adapted to move against the force of preloaded resilient means when said inertia-operated member is subjected to a predetermined value of the deceleration generated upon the braking operation.

Such a braking pressure limiting device is more advantageous than the sloping ramp type limiting device, well-known by anyone skilled in the art, because it is stronger and easier to construct. Furthermore, it is less responsive to the obliquity variations of the axis of revolution of the inertia operated ball member. In the sloping ramp type limiting devices the return force acting against the displacement of the ball depends on the weight of this latter multiplied by a coefficient which mainly depends on the obliquity of the ramp. This obliquity being important, it results that a slight variation in each direction with respect to the optimal value entails a large variation of the coefficient of the return force.

With such type of braking pressure limiting device, object of the invention, the return force is mainly insured by preloaded resilient means, the displacement axis of the inertia-operated-member being horizontal. It results therefrom that the variations of the return force caused by the weight of the inertia-operated member upon small variations of the obliquity in each direction with respect to the horizontal, will be negligible, because the coefficient of the weight for slight variations of obliquity remains small and does not vary substantially.

The response characteristic of this type of braking pressure limiting device, makes this latter less sensitive to the variations of the trim of the vehicle caused by the shift of the load upon braking or by the variations of the load of the vehicle. Furthermore, the tolerances of the mounting of the limiting device on the chassis need less accuracy and are expensive to respect than in the sloping ramp type limiting device.

In this kind of limiting device, it is suitable to introduce a compensation coefficient varying as a function of the load of the vehicle. In effect, it is well known by the expert that with a loaded vehicle the intensity of the maximal permissible deceleration, before skiding, is more important than the intensity of the maximal permissible deceleration when the vehicle is unloaded. It is possible to use an additional connection in the limiter to control this latter with a view to introducing this compensation coefficient which depends on the load of the vehicle. Such a connection may be effected for instance by a mechanical transmission member which is responsive to the load of the vehicle which is measured as the distance between the frame and the considered axle. This additional connection has numerous drawbacks.

Consequently, it is one of the objects of this invention to use the braking control pressure to introduce this compensation coefficient. More particularly it is a feature of this invention that the preloaded resilient means are located between the inertia-operated member and a movable pressure responsive compensating means which are responsive to the braking pressure and adapted to increase the load of said preloaded resilient means according to said pressure.

In effect, although for a given vehicle the braking pressure is actuated by the driver, it substantially depends on the load of the vehicle: it is obvious that, to brake quickly the latter, that is to communicate to it a relatively substantial deceleration, the braking control pressure will increase with the loading of the vehicle. This is more apparent when the braking pressure reaches a predetermined value, the corresponding deceleration will be higher when the vehicle is unloaded than when it is loaded. In each case the driver releases his effort or pushes harder on the braking pedal automatically in order to obtain the deceleration he considers to be necessary for stopping or braking in the distance imposed to him.

The braking control pressure thus provides a very convenient means to estimate roughly the load of the vehicle. However this estimate is entirely sufficient to provide the device with a compensating coefficient depending on the load of the vehicle. Furthermore, such devices are free of any mechanical movable connection with the frame and/or the considered axle. They are adapted to a quick mounting on all types of vehicles and on any portion of the chassis adjacent or not, to the considered axle.

According to another feature of the invention, said compensating means comprise in the housing a resiliently deformable leaf spring located substantially perpendicular to the vehicle axis to provide a relatively movable portion on which is secured said inertia operated member, said leaf spring cooperating with an adjusting member connected to the housing and with said compensating means so that said leaf spring is subjected to a first return torque varying as function of the position of said adjusting member and to a second return torque varying as a function of the position of said compensating means.

This arrangement allows to suppress any contact between the ball and the housing in which it moves, said inertia-operated member is biased by the resiliency of the leaf spring. The housing is provided with no rolling surfaces nor pivot forming shaft, and this it is very easy to manufacture and very cheap.

Other features and advantages of the invention will appear more clearly in the following description referring to the accompanying drawing the single figure of which is a lateral view in cross section of a braking pressure limiting device accordingly to the invention.

In the drawing, the housing designated by the reference numeral 10 is provided with an inner chamber 12. Chamber 12 has an inlet 14 connected with a master cylinder (not shown) and an outlet connected with the wheel cylinders (not shown) of a set of brakes of a same vehicle axle on which said device 10 is located.

The passage between chamber 12 and the outlet 16 is controlled by a movable inertia operated-ball member 18 of partially spherical shape in the represented embodiment. Said ball 18 is adapted to sealingly engage a valve seat fixed to the housing 10 and connected with the outlet 16. In the represented embodiment, the seat 20 is made of a synthetic material. This confers to the seat 20 a resiliency which insures a good contact sealing and a compressibility.

The ball 18 is secured at one of the ends of a leaf spring 22 which is located in the housing so that it is substantially perpendicular to the longitudinal axis of the vehicle, on which the device 10 is mounted. The opposite end of the leaf spring is fixed by any known means to a plunger piston 24 sealingly and slidingly mounted in a bore 26 provided in the body of housing 10 to connect the inner chamber 12 with the external portion of the housing. The bore 26 is substantially parallel to the longitudinal axis of the vehicle, and is closed at its free end by a threaded sleeve 28 locked in position by a lock nut 32. The sleeve 28 which has an axial drilling connecting the housing 26 to which the atmosphere is used as an adjustable abutment for a preloaded compression spring 30 located between the sleeve and the piston 24 to urge this latter inwardly into chamber 12 against an abutment 34 provided in the housing. In its intermediate portion the leaf spring bears substantially on an adjustable anchorage axle 36 solid with the housing. In the present embodiment, the axle 36 is eccentrically mounted on a shaft 38 rotatable in the housing 10. Locking means (not shown) of any type are provided to define the angular position of the shaft 38 and thus the position of the axle 36. Due to the deformation caused by the location of the axle 36, the end of the leaf spring 22 which is fixed to the ball 18 is urged against an abutment 40 provided in the housing in front of the seat 20. Abutment 40 is connected with the housing 10 but any known device such a screw modifying the axial position of the abutment 40 might be used. The same also applies to abutment 34.

The operation of the limiting device described hereinabove is the following. In the rest position corresponding to the brake releasing, the ball 18 is biased against the abutment 40 with an initial force which is a function of the elasticity of the leaf and of the relative location of abutments 40 and 34 and of the anchorage axle 36. Piston 24 bears onto abutment 34 under the conjugated action of the resilient return forces of the leaf spring 22 and of the compression spring 30.

Upon braking, the control pressure from the master cylinder reaches the wheel cylinders by the inlet 14, the inner chamber 12 and the outlet 16 of the limiting device. The vehicle is subjected at a deceleration which mainly depends upon the vehicle load, the braking conditions and the braking force controlled by the driver. After a predetermined time, this deceleration increasing upon braking pressure exceeds a predetermined value of the deceleration called "cut off" deceleration for which the inertia force urging the ball 18 against the seat 20 becomes equal to the initial return force biasing the ball against the abutment 40. At this moment, due to the elasticity of the leaf 22, the ball 18 leaves the abutment 40 to engage the seat 20 and thus isolate the wheel cylinders from the master cylinder. The isolation of a set of brakes of a same vehicle axle, when the deceleration reaches a predetermined value, prevents intempestive blocking of the wheels of the considered axle by the effect of a too high braking pressure for the effective load of the axle. Consequently, the pressure from the master cylinder acts upon the effective cross-section area of the piston 24 against the return force of the preloaded spring 30. It results therefrom that the control pressure in chamber 12 is adapted to modify the position of the piston 24 and thus to increase (with the return force operating on the ball 18) the value of the braking deceleration causing the cutting-off of the brakes of the wheels of the axle. The control pressure which is, as already explained, implicitly function of the load of the vehicle, constitutes a control of the value of the braking deceleration in function of the load of the vehicle. Thus an inertia proportioning device has been postponed in which the inertia movable control member is also substantially responsive to the load on the vehicle axle.

In the shown embodiment, the ball 18 constitutes the check valve cooperating with the seat 20. It is obvious that it is possible to use any known type of one-way check valve located between the outlet 16 and the chamber 12 in combination with a control element connecting the ball 18 with the check valve to urge this latter toward its open position when the ball engages the abutment 40.

The invention is not limited to the described embodiment, many modifications should be made for instance with respect to the relative positions of piston 24, the axis 36 and the ball 18 and should be considered as within the scope of the present invention.

I claim:

1. A vehicle braking pressure limiting device comprising in a housing an inertia-operated member movable substantially parallel to the vehicle axis and adapted to move against the force of preloaded resilient means to shut-off the communication between the brake control master-cylinder and the wheel cylinders of a set of brakes of a same vehicle axle when said inertia-operated member is subjected to a predetermined value of the deceleration generated upon the braking operation, said pressure limiting device being characterized in that said preloaded resilient means are located between said inertia-operated member and a movable pressure responsive compensating means which are responsive to the braking pressure and adapted to increase the load of said preloaded resilient means according to said braking pressure.

2. A vehicle braking pressure limiting device according to claim 1, characterized in that said compensating means comprise a plunger subjected to the force of a compression spring which urges the latter toward an abutment provided in said housing against the braking pressure force acting on the effective area of said plunger.

3. A vehicle braking pressure limiting device according to claim 2, characterized in that said compression spring is provided with non linear characteristic, adjusting means being provided for modifying the initial load of said compression spring.

4. A vehicle braking pressure limiting device according to claim 1, and further characterized in that an adjusting mechanism is provided to modify the initial load of said preloaded resilient means independently from said compensating means.

5. A vehicle braking pressure limiting device according to claim 1, and further characterized in that said preloaded resilient means comprise a resiliently deformable leaf spring located substantially perpendicular to the vehicle axis to provide a relatively movable portion on which is secured said inertia operated member, said leaf spring cooperating with an adjusting member connected to said housing and with said compensating means so that said leaf spring is subjected to a first return torque varying as a function of the position of said compensating means and to a second return torque varying as a function of the position of said adjusting member.

6. A vehicle braking pressure limiting device according to claim 1, and further characterized in that said inertia-operated member comprises a portion forming a check valve adapted to sealingly cooperate with a valve seat connected to said wheel cylinders.

7. A vehicle braking pressure limiting device according to claim 1, and further characterized in that said inertia-operated member is biased by return resilient means against abutment means provided in said housing.

References Cited

UNITED STATES PATENTS 2,703,582   3/1955   Stepanian _____ 137—45 XR
3,317,251   2/1967   Hambling et al. ____ 303—6 XR MILTON BUCHLER, *Primary Examiner.*

J. J. McLAUGHLIN, *Assistant Examiner.*